United States Patent

[11] 3,589,236

[72] Inventor Richard R. Wareham
 Marblehead, Mass.
[21] Appl. No. 798,062
[22] Filed Feb. 10, 1969
[45] Patented June 29, 1971
[73] Assignee Polaroid Corporation
 Cambridge, Mass.

[54] VIEWFINDER HAVING A VARIABLE SIZE FRAME IMAGE
 5 Claims, 4 Drawing Figs.
[52] U.S. Cl. .................................................. 88/1.5, 95/44
[51] Int. Cl. ..................................................... G03b 13/12, G03b 13/22
[50] Field of Search ........................................... 88/1.5; 95/44

[56] References Cited
UNITED STATES PATENTS
| | | | |
|---|---|---|---|
| 2,093,299 | 9/1937 | Zimmermann ............. | 88/1.5 |
| 2,166,148 | 7/1939 | Heinisch ..................... | 88/1.5 |
| 2,924,143 | 2/1960 | Kaprelian et al. ........... | 88/1.5 UX |

Primary Examiner—Ronald L. Wibert
Assistant Examiner—Orville B. Chew, II
Attorneys—Brown and Mikulka, William D. Roberson and Frederick H. Brustman ABSTRACT: With many optical devices it is not possible for the operator to directly determine the field of view of the optical device he is using. To assist the operator in the proper use of such optical devices, they are commonly fitted with viewfinders through which the operator can sight as a means of properly aiming the optical device. An example of such an arrangement is found in simple box cameras.

PATENTED JUN29 1971

3,589,236

INVENTOR.
RICHARD R. WAREHAM

BY Brown and Mikulka
and
Frederick H. Brustman
ATTORNEYS

3,589,236

VIEWFINDER HAVING A VARIABLE SIZE FRAME IMAGE

BACKGROUND OF THE INVENTION

With many optical devices it is not possible for the operator to directly determine the field of view of the optical device he is using. To assist the operator in the proper use of such optical devices, they are commonly fitted with viewfinders through which the operator can sight as a means of properly aiming the optical device. An example of such an arrangement is found in simple box cameras.

Many optical devices and photographic cameras today come equipped with variable focal length lenses which effect significant changes in the field of view of the device. It is desirable that a viewfinder used in conjunction with such variable focal length lenses be constructed in such a manner that the field of view delineated by the reference frame of the viewfinder should correspond to the changing field of view of the principal optical device as the focal length of its lens is changed.

Some methods for viewfinding in such situations include the use of reflex viewfinders operating directly through the variable focal length lens of the principal optical device and viewfinders wherein the reticle is constructed so that its dimensions may be changed in accordance with the changes in the focal length of the lens.

SUMMARY OF THE INVENTION

This invention relates to a virtual frame image viewfinder wherein the apparent angular field of the frame image as perceived in the viewfinder can be smoothly changed by optical means. The means which controls the change can be linked proportionally to some related device.

An object of this invention is a viewfinder with a variable size reference frame.

Another object of this invention is a viewfinder wherein the apparent size of the reference frame about the scene can be changed easily.

Still another object of this invention is a variable reference frame viewfinder of simple construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

DESCRIPTION OF THE DRAWING

For a fuller understanding of the nature and objects of the invention, reference should be had to the following detailed description taken in connection with the drawing wherein.

DESCRIPTION OF THE PREFERRED EMBODIMENT

Figure 1:
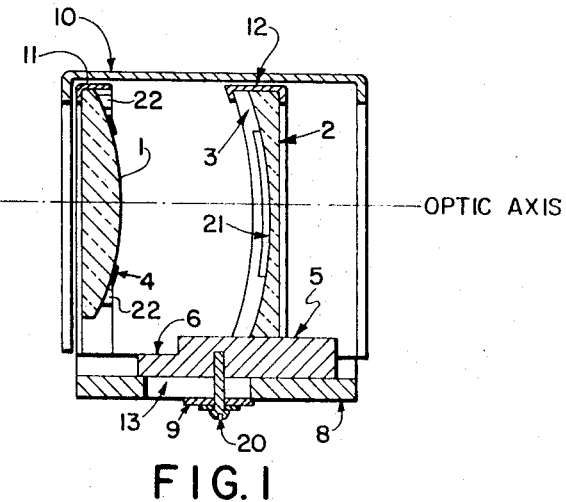
FIG. 1 is a cross section of the viewfinder showing the arrangement of the optical elements.
Figure 3:
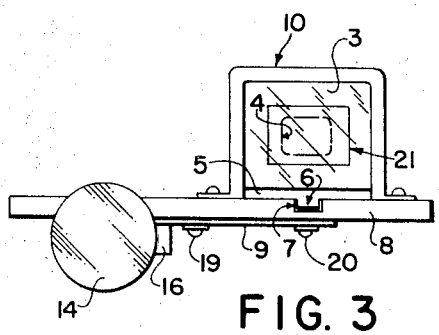
FIG. 3 shows the entrance side of the viewfinder.

The principal optical elements of the viewfinder are shown in FIG. 1. The optical system shown is essentially a reverse Galilean telescope wherein the rear element 1 is a planoconvex lens an the front element 2 is a planoconcave lens. A reticle 4 is located on the convex surface of the rear element 1 ich faces towards the concave surface of the front element The concave surface of the front element 2 has a mirror coating 3 on its surface with a rectangular aperture window 21 therein. The front and rear elements 2 and 1 are aligned on a common optic axis along which the observer, represented by the eye, sights to view the scene. Light enters the viewfinder through the window 21 formed by the aperture in the mirror surface 3 on the concave surface of the front element 2 and illuminates the reticle 4. The concave mirror 3 receives light reflected by the reticle 4 and forms a virtual image of the reticle 4 which appears, to the observer, to be situated some distance in front of the viewfinder.

The reticle 4 is designed so that the virtual image formed by the mirror 3 is a frame which defines the field of view of the principal optical device.

When the concave mirror 3 on the front element 2 is spaced apart from the reticle 4 on the rear element 1 by a distance equal to the focal length of the curved mirror 3, the virtual image formed by the mirror 3 appears to be located at infinity. To the observer viewing along the optical axis the frame formed by the virtual image of the reticle appears to be in the vicinity of the scene observed through the viewfinder.

The design of the front and rear lens elements 2 and 1, which comprise a reverse Galilean telescope, is such that when spaced apart by the focal length of the curved mirror 3, the image of the scene and the image of the reticle, which appears to be a frame about the scene, are appropriately sized. The frame and the scene formed by the telescope thus have the proper relation to the field of the principal optical device with which the viewfinder is associated.

When the front lens element 2 is moved closer to the reticle 4 on the rear lens element 1, the distance between the mirror 3 and the reticle 4 becomes less than the focal length of the mirror 3. The virtual image formed by the mirror 3 of the reticle 4 appears to the observer to grow smaller. Simultaneously, the scene which is viewed through the telescope appears to increase in size as the distance between the front and rear lens elements 2 and 1 decreases. The total effect perceived by the observer, looking through the viewfinder, is that the size of the field as outlined by the frame image formed is changing. The image of the frame seen in the viewfinder appears to be closing in on the central portion of the scene. The observer, looking through the viewfinder, perceives the reverse effect when the elements of the viewfinder are subsequently moved apart.

The apparent frame size changes very rapidly in comparison to the field of view as the distance between the front 2 and rear 1 elements is changed. The observer's perception is that the frame image size is changing rapidly on an approximately constant field of view. Thus, the observer always knows how the framed field relates to the maximum field of the viewfinder and any device which the viewfinder is functionally related.

As the front and rear lens elements 2 and 1 of the telescope are moved together, both the virtual image of the reticle 4 and the image of the scene get slightly out of focus and their relative positions in front of the viewfinder change. The observer can accommodate for these changes sufficiently so that the effect does not negate the essential appearance produced, which is that of the frame changing size relative to the scene. Despite a slightly fuzzy appearance at times, the observer sees a different portion of the scene outlined in the viewfinder as the distance between the front and rear elements 2 and 1 changes.

Figure 4:
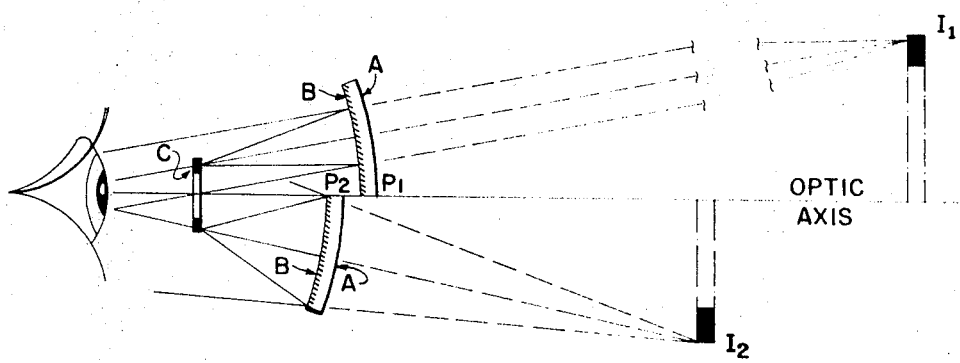
FIG. 4 is a schematic representation showing the change in the virtual image of the reticle with motion of the front element.

What takes place can be better understood from examination of FIG. 4, which is a simplified representation of the essential elements of the viewfinder which cooperate to form the virtual image of the reticle. In FIG. 4 the reticle is denoted C and the virtual image forming mirror is a semitransparent reflective coating B on a curved transparent optical element A which possesses no refractive power. The element A is shown located in two positions. The first position $P_1$ represents the situation where the mirror B is spaced apart from the reticle C by a distance equal to the focal length of the mirror B. The mirror forms a virtual image $I_1$ of the reticle C, which appears to be very far away. When the optical element A is moved closer to the reticle C so that the mirror B is at a distance from the reticle C which is less than the focal length of the mirror B as shown in position $P_2$, the virtual image $I_2$ formed of the reticle C by the mirror B appears to the observer to be located closer than the first image $I_1$. The image $I_2$ also appears to be smaller than the image $I_1$. Although the virtual image of $I_2$ is formed closer to the observer than the virtual image of $I_1$, the apparent distance of $I_2$ in front of the observer is still great enough that it does not seem to be obviously closer than the image of $I_1$. The distinctive feature of the change resulting from moving the optical element A closer to the reticle C which is perceived by the observer is the apparent change in size of the reticle images. This essentially looks to the observer as if the frame which he sees in front of the viewfinder is decreasing in size relative to the background scene as the optical element A is moved closer to the reticle C.

Referring again to FIG. 1, the rear lens element 1 is held in position by a clamp 11 which is soldered to the base 8. Tabs 22 support the rear lens element in the clamp 11. The front lens element 2 is held in place on the slide 5 by another clamp 12 which is soldered to the slide 5. Both lens elements 1 and 2 are covered by a hood 10 with windows at the entrance and exit, which prevents stray light from entering the viewfinder. The slide 5 possesses a guide rail 6, which slides in a guideway 7 cut in the base 8. The purpose of the guide 6 and the guideway 7 are to maintain the front lens element 2 in the proper optical alignment with the rear lens element 1 as the front lens element 2 is moved back and forth.

Figure 2:
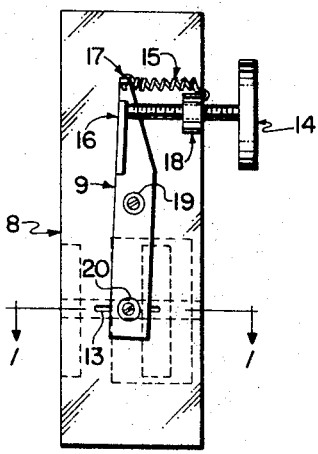
FIG. 2 discloses the mechanical arrangement for sliding the front element of the viewfinder.

The mechanism for adjusting the position of the front lens element 2 bearing the mirror 3 on its concave surface is shown in FIG. 2. A slot 13 is cut through the base 8. The slide 5 is connected to the lever 9 by a screw 20 which passes through the slot 13. The lever 9 is pivoted about another screw 19 which is attached to the base 8. A tab 16 is positioned at the end of the lever 9, where a thumbscrew 14 can bear on the tab 16. The thumbscrew 14 is threaded into a block 18 which is fixed to the base 8 so that when the thumbscrew 14 is rotated by the observer, it will move in and out of the block 18 pushing on tab 16. A tension spring 15 is connected to the lever 9 through a hole 17 and attached at the opposite end to the block 18. The tension spring 15 serves to return the lever when the thumbscrew 14 is backed away from the tab 16. This arrangement permits the front lens element 2 to be moved forward and backward by turning the thumbscrew 14 in the appropriate direction.

The mechanism for adjusting the position of the front lens element 2 and therefore which controls the frame size or the apparent field of view subtended in the viewfinder can be connected to some other mechanism besides the thumbscrew. This other mechanism, for example, could be the control for a variable focal length lens. Then the changing frame size in the viewfinder would be related to and controlled by the changing angular field of view of the principal variable focal length lens.

Those skilled in the art appreciate that there are several minor changes which can be made in the general configuration of the apparatus of this invention which are not of any consequence and are the complete equivalent of the invention as disclosed herein.

Since certain changes may be made in the above apparatus without departing from the scope of the invention herein involved, it is intended that all matter contained in the above description or shown in the accompanying drawing shall be interpreted as illustrative and not in a limiting sense.

What I claim is:

1. A viewfinder comprising:
    an entrance window;
    an exit window;
    reticle means at said exit window;
    movably mounted image-forming light reflecting means, proximate said entrance window and coaxial with said viewfinder, for forming a virtual image of said reticle means and directing the light forming said image through said exit window;
    means for adjustably altering the distance between said image-forming means and said reticle means for changing the size of said virtual reticle image.

2. A viewfinder as in claim 1 wherein said adjusting means varies said distance between a distance equal to the focal length of said image-forming light reflecting means and a lesser distance.

3. A viewfinder as in claim 1 wherein said reticle means defines a frame.

4. A viewfinder as in claim 1 wherein said image-forming light reflecting means is a partially transparent mirror.

5. A viewfinder as in claim 1 wherein said image-forming light reflecting means is a mirror with a transparent aperture coincident with said entrance window.